UNITED STATES PATENT OFFICE.

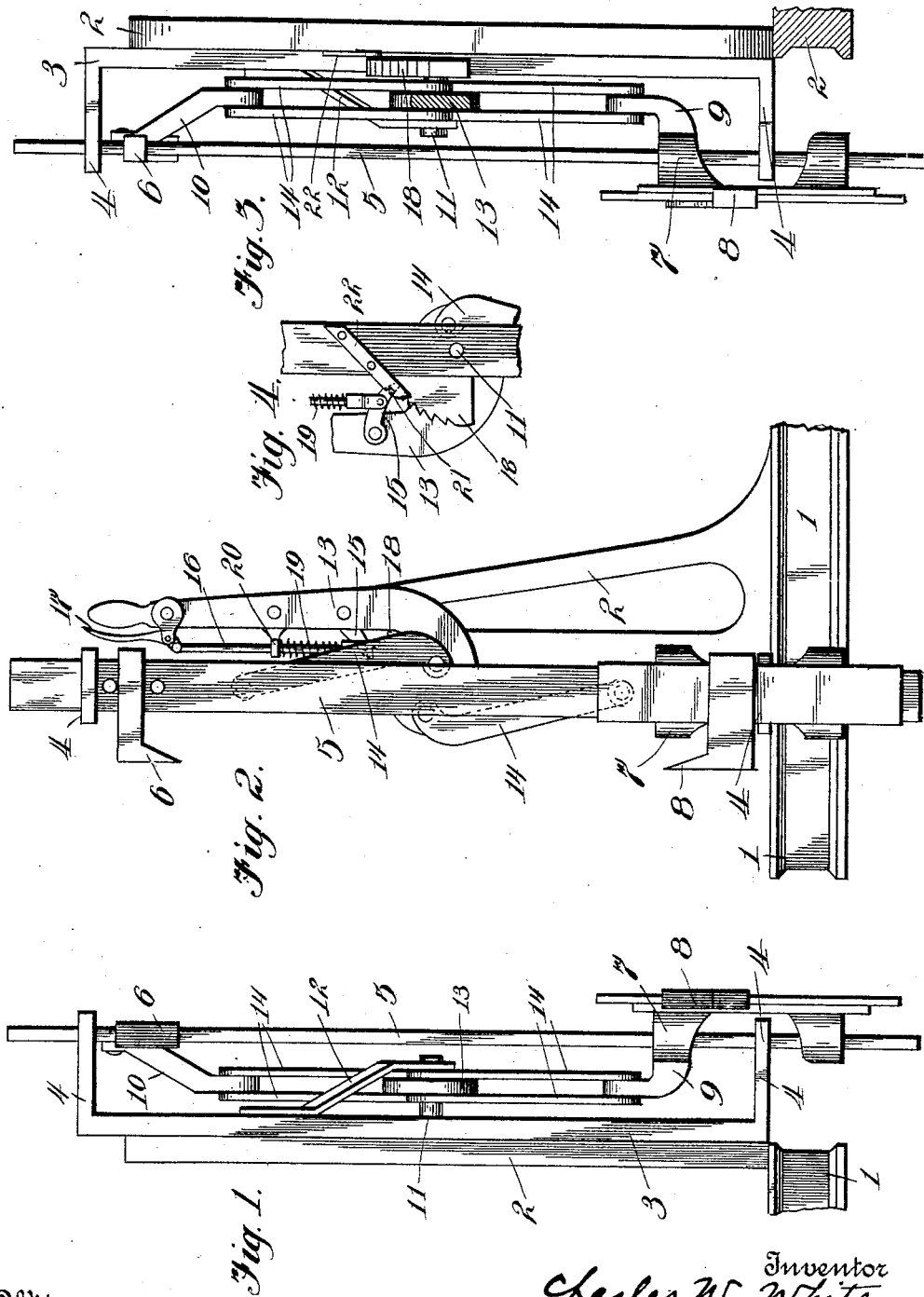

CHARLES W. WHITE, OF EVANSVILLE, INDIANA.

SAWMILL-DOG.

No. 823,013.  Specification of Letters Patent.  Patented June 12, 1906.

Application filed January 14, 1905. Serial No. 241,067.

*To all whom it may concern:*

Be it known that I, CHARLES W. WHITE, a citizen of the United States, residing at Evansville, county of Vanderburg, and State of Indiana, have invented certain new and useful Improvements in Sawmill-Dogs, of which the following is a specification.

My invention relates to improvements in sawmill-dogs, and more especially to that class of dogs which engage the log from underneath and from above and are known in the art as "lever-operated" dogs.

The object of the invention is to provide a device which will engage the upper or lower surfaces of round or quartered logs and prevent the logs fom moving; also to hold the logs while they are moved over the carriage by the head-block and there retained in their proper position with relation to the saw.

Other objects are the provision of, first, a novel bridge-strap or bracket for securing the lever-pivot stud or pin; second, duplicate arms connecting the operating-lever to the dogs to distribute the strains and prevent breaking of the pivot-pins as well as strengthen the device; and, third, an improved casting for the lower dog, whereby great strength and rigidity and freedom from breakage of this dog is obtained.

A further object of the invention is the provision of means whereby the engaging dogs are positively held in inoperative position while the log is being placed upon the carriage.

In devices of similar construction the lever as a general rule has a tendency to drop down and force the dogs into engageable position, and when the log is placed upon the carriage the engaging dogs are not in a position to grasp the log, thus requiring the attention of another hand to place the engaging dogs in operative position, whereas with my invention the dogs are locked in operative position or in engageable position until the operator desires to force the dogs into engagement with the log.

Another object of the invention is to provide a novel way in which the dogs are held out of engagement with the log by means of locking devices hereinafter more specifically described; and the invention consists in the novel features and combination of parts, as will be hereinafter more fully set forth, and recited in the appended claim.

Reference being had to the accompanying drawings, which form part of this specification, Figure 1 is a front view of the device as attached to the head-block of the sawmill set-works. Fig. 2 is a side elevation of the device. Fig. 3 is a rear view of the device. Fig. 4 is a detail view of the locking-catch and its operating parts.

Referring more specially to the drawings, 1 represents the carriage of the ordinary set-works, upon which are reciprocally mounted the ordinary head-blocks 2. Rigidly secured to the side of each head-block is a U-shaped frame 3, having apertures in each leg 4 for the reception of a sliding bar 5, to which is secured the upper dog 6. On the lower end of the bar 5 is slidably mounted a casting 7, carrying the lower dog 8 and provided with an inwardly-projecting arm 9, which is similar in construction to an arm 10, securely attached to the bar 5 and the upper dog 6. The function of these arms 9 and 10 will be described hereinafter. The use of the lower extension of casting 7 below the lower one of the two arms 4 is of great practical advantage, because the strain is applied both above and below said arm 4, and thus breakage, likely to happen if this lower extension were not provided, is obviated.

Rigidly secured to the central portion of the frame 3 is a stub-shaft 11, which is held in proper position by the rigid bracket 12, secured to frame 3 and on which is journaled the lever 13 of peculiar construction. Mounted on the lever eccentrically from its pivotal point are two sets or pairs of arms 14, which are in turn pivoted to the arms 9 and 10 (on opposite sides thereof) and act directly upon the dogs 6 and 8. The employment of the bracket 12 renders the stub-shaft 11 perfectly rigid and prevents breaking or bending thereof, which would occur were this bracket not used. By using a pair of the arms 14 instead of but one of them the strain is evenly divided as between the operating-lever and the arms 9 and 10, thus preventing the breaking or bending of the connecting-pins. The lever 13 has pivoted thereon a pawl 15, which is operated by the rod 16 and hand-lever 17, and this pawl is normally forced into engagement with the toothed segment 18, rigidly secured to the frame 3 by a spiral spring 19, surrounding the rod 16 and confined by a lug 20. Extending out from the pawl 15 is a short stud or arm 21, adapted to normally engage with a catch 22, extending out from the frame 3. This pawl normally engages the catch 2 when the dogs are thrown in released position and can only be released from the catch by the operation of the hand-lever 17. This insures a positive locking of the dogs in their distended position and also prevents the dropping of the lever at the time when the log is being placed upon the carriage.

The operation of the device is as follows: The lever being forced upward to its locked position, the dogs are at this time in distended position and the log is ready to be placed upon the carriage. After the log has been placed in its proper position against the head-block the lever is released by depressing the hand-lever 17 and pulled down, the pawl 15 riding idly over the teeth of the segment 18 until the dogs, which are raised and lowered by the arms 14, grasp the log from beneath and above. This insures a secure arrangement with relation to the head-block, which can now be moved forward so that the log is presented properly.

The advantage of having the locking-stud or arm 21 carried by the pawl and engageable with the catch 22 is very apparent, as there is no other lever to operate than the hand-lever 17 to release the pawl from engagement with the catch, and when the dogs are disengaged from the log the hand-lever has to be operated to release the pawl from the segment, and as soon as the hand-lever 17 is released the locking stud or arm 21 flies into engagement with the catch 22 by action of the spiral spring 19.

Having thus described my invention, what I claim as new, and desire to secure by Letters Patent, is—

In a sawmill-dog, the combination with a frame having laterally-extending legs, of a bar slidable through said legs, a dog secured to said bar, a dog-bracket having arms located on opposite sides of one of the legs of the frame and through which arms the bar is slidable, a dog carried by said bracket, a lever pivoted to the frame, and operative connections between the lever and the bar and between the lever and the dog-bracket.

In testimony whereof I hereunto affix my signature in presence of two witnesses.

CHARLES W. WHITE.

Witnesses:
PEARL A. WHITE,
CHAS. H. SCHMIDT.